United States Patent
Nagai

(10) Patent No.: US 7,278,726 B2
(45) Date of Patent: Oct. 9, 2007

(54) INK JET RECORDING INK SET

(75) Inventor: Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 268 days.

(21) Appl. No.: 10/480,801

(22) PCT Filed: Jun. 19, 2002

(86) PCT No.: PCT/JP02/06123

§ 371 (c)(1),
(2), (4) Date: Dec. 19, 2003

(87) PCT Pub. No.: WO02/102906

PCT Pub. Date: Dec. 27, 2002

(65) Prior Publication Data

US 2004/0155946 A1    Aug. 12, 2004

(30) Foreign Application Priority Data

Jun. 19, 2001    (JP) ............................. 2001-185111

(51) Int. Cl.
*G01D 11/00* (2006.01)
(52) U.S. Cl. ...................... 347/100; 347/95; 523/160

(58) Field of Classification Search ............... 347/100, 347/101, 95, 96; 106/31.6, 31.13, 31.27; 523/160
See application file for complete search history.

(56) References Cited

U.S. PATENT DOCUMENTS

| 5,861,447 A | * | 1/1999 | Nagasawa et al. ........... 523/161 |
| 2001/0033318 A1 | * | 10/2001 | Koitabashi et al. ......... 347/101 |
| 2002/0135650 A1 | * | 9/2002 | Nagai et al. ................ 347/100 |

FOREIGN PATENT DOCUMENTS

| JP | 2000-53898 | | 2/2000 |
| JP | 2001-115069 | * | 4/2001 |

* cited by examiner

*Primary Examiner*—Manish S. Shah
(74) *Attorney, Agent, or Firm*—Oblon, Spivak, McClelland, Maier & Neustadt, P.C.

(57) ABSTRACT

Disclosed is an ink set for use in an ink jet recording process, wherein at least two aqueous inks A and B having different hues are superimposed to form a color image. The ink set can give a clear color image by high speed printing having good resolution without bleeding in the boundaries between two colors. Disclosed also are a method, an ink cartridge and an apparatus for ink jet recording using the above ink set. The ink set is characterized in that, of the two aqueous inks A and B, one ink A includes a coloring material A having an anionic group and in that the other ink B includes a coloring material B and a quaternary ammonium salt having at least one alkyl group which has 6 or less carbon atoms and which has a hydroxyl group.

15 Claims, 3 Drawing Sheets

INK JET RECORDING INK SET

TECHNICAL FIELD

The present invention relates to an ink set for use in an ink jet recording process, wherein at least two aqueous inks A and B having different hues are superimposed to form a color image, to a method, to an ink cartridge and to an apparatus for ink jet recording using the ink set.

BACKGROUND ART

Ink-jet printers have been widely utilized in recent years because of their advantages such as low noises and low running costs. Color ink-jet printers capable of producing color images on a plain paper have also been on sale in the marketplace. It is, however, extremely difficult to meet with all requirements for color reproducibility, water resistance, light resistance, image drying characteristics, prevention of bleeding and reliability of ink-ejection. In particular, in the case of a color printer, image deterioration is apt to take place at red, green and blue regions in which two colors are superimposed, although no such image deterioration occurs in single color printed portions of yellow, magenta or cyan. Especially when ink images on a paper are dried without using any image fixing unit, significant bleeding occurs in the recorded image, even when an improvement in drying characteristics is attempted by increasing the penetrating efficiency of the ink into the paper (Japanese Unexamined Patent Publication No. S55-29546).

Japanese Examined Patent Publication No. 60-23793 describes that an ink containing a dialkylsulfosuccinic acid as a surfactant can improve drying characteristics so that deterioration of image quality is minimized. However, this ink has problems that pixel diameters considerably vary depending on the paper quality, that the image density is considerably decreased and that the surfactant contained in the ink is decomposed in an alkaline environment so that the effect thereof is lost during storage.

Japanese Unexamined Patent Publication No. S56-57862 discloses an ink containing a strongly basic material. While the ink is effective for printing on an acidic paper sized with rosin, no improvement is observed when the ink images are formed on a paper manufactured using an alkyl ketene dimer or an alkenyl sulfosuccinic acid as a sizing agent. Even with an acidic paper, the ink fails to show an effect at image portions in which two colors are superimposed.

Japanese Unexamined Patent Publication No. H01-203483 discloses a recording ink characterized by containing a polyhydric alcohol derivative and pectin. The pectin is added as a thickening agent for preventing the image blurs. However, the pectin is a nonionic material having a hydroxyl group as a hydrophilic group. Therefore, this ink has a problem that the stability in ejection is low when the printing operation is interrupted for a certain period of time.

To cope with the above problems, the currently adopted measure is to use multi-path recording for reducing an amount of ink penetrating into a paper while improving the image density. In attaining high speed printing, however, it is a problem to reduce penetration of an ink into a paper, especially the penetration of an ink in the direction of the thickness thereof at secondary color portions.

Japanese Unexamined Patent Publication No. 2001-55533, and No. 2001-8138 disclose an ink in which a black pigment ink is used for reducing penetration into a paper and for increasing the image density and dye-containing color inks are used for color inks other than black and for increasing penetration into the paper, and in which bleeding in boundaries between the black and other colors is suppressed by reaction. With these inks, however, bleeding cannot be prevented at a high printing speed. The known inks are still not fully satisfactory.

It is, therefore, an object of the present invention to provide an ink set for an ink jet recording process, wherein at least two aqueous inks A and B having different hues are superimposed to form a color image, the ink set being capable of giving a clear color image by high speed printing having good resolution without bleeding in the boundaries between two colors. It is also an object of the present invention to provide a method, an ink cartridge and an apparatus for ink jet recording using the above ink set.

DISCLOSURE OF THE INVENTION

The present inventors have made an earnest study for solving the above problems and, as a consequence, have completed the present invention.

Thus, in accordance with the present invention, there are provided the following ink set, recording method, ink cartridge and apparatus for ink jet recording.

(1) An ink set for use in an ink jet recording process wherein at least two aqueous inks A and B having different hues are superimposed to form a color image, characterized in that, of the two aqueous inks A and B, one ink A comprises a coloring material A having an anionic group and in that the other ink B comprises a coloring material B and a quaternary ammonium salt having at least one alkyl group which has 6 or less carbon atoms and which has a hydroxyl group.

(2) An ink set for use in an ink jet recording process as recited in (1) above, characterized in that said ink A is a black ink containing a self-dispersion type pigment comprising anion group-bearing carbon, in that said ink B is a color ink selected from the group consisting of an yellow ink, an cyan ink and a magenta ink, and in that said quaternary ammonium salt is a quaternary ammonium salt represented by the following general formula (I):

wherein $R_1$, $R_2$, $R_3$ and $R_4$ are each an alkyl group having 6 or less carbon atoms, a halogenated alkyl group having 6 or less carbon atoms or a hydroxyalkyl group having 6 or less carbon atoms with the proviso that at least one of $R_1$, $R_2$, $R_3$ and $R_4$ is a hydroxyalkyl group, and $X^-$ represents a counter ion.

(3) An ink set for use in an ink jet recording process as recited in (1) or (2) above, characterized in that said quaternary ammonium salt is a quaternary ammonium salt represented by the following general formula (II), (III) or (IV):

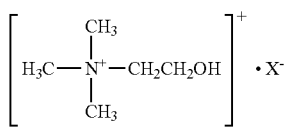

wherein X⁻ represents a counter ion,

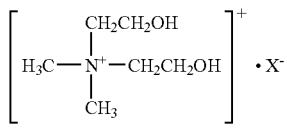

wherein X⁻ represents a counter ion,

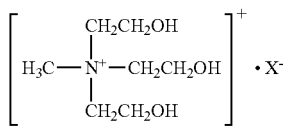

wherein X⁻ represents a counter ion.

(4) An ink set for use in an ink jet recording process as recited in (1) above, characterized in that said ink A is a color ink selected from the group consisting of an yellow ink, an cyan ink and a magenta ink, and in that said coloring material A contained in said ink A is a self-dispersion type pigment having an anionic group.

(5) An ink set for use in an ink jet recording process as recited in (4) above, characterized in that said quaternary ammonium salt is a quaternary ammonium salt represented by the following general formula (II), (III) or (IV):

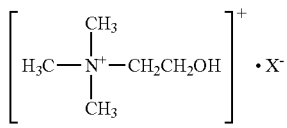

wherein X⁻ represents a counter ion,

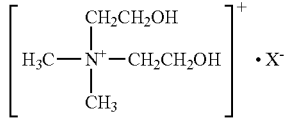

wherein X⁻ represents a counter ion,

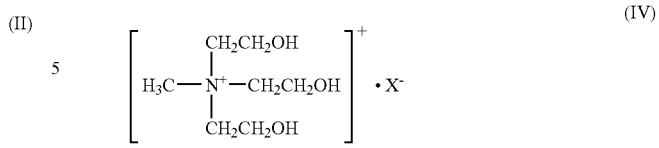

wherein X⁻ represents a counter ion.

(6) An ink set for use in an ink jet recording process as recited in any one of (1) through (5) above, characterized in that said coloring material B contained in said ink B is a water-insoluble coloring material, and in that said ink B comprises a polymer dispersing agent.

(7) An ink set for use in an ink jet recording process as recited in any one of (1) through (5) above, characterized in that said coloring material B contained in said ink B is a water-insoluble coloring material, and in that said ink B comprises a surfactant dispersing agent.

(8) An ink set for use in an ink jet recording process as recited in any one of (1) through (5) above, characterized in that said coloring material B is a dye having a carboxylic acid group and/or a sulfonic acid group.

(9) An ink set for use in an ink jet recording process as recited in any one of (1) through (5) above, characterized in that said coloring material B comprises fine particles colored with a dye or a pigment.

(10) An ink set for use in an ink jet recording process as recited in any one of (1) through (9) above, characterized in that said ink A and/or B comprises at least one water-soluble organic solvent selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone and 1,3-dimethyl-2-imidazolidinone.

(11) An ink set for use in an ink jet recording process as recited in any one of (1) through (10) above, characterized in that said ink A and/or B comprise at least one surfactant selected from the group consisting of acetylene glycol surfactants, polyoxyethylene alkyl ether surfactants, polyoxyethylene alkylphenyl ether surfactants and fluorine-containing surfactants.

(12) An ink set for use in an ink jet recording process as recited in any one of (1) through (10) above, characterized in that said ink A and/or B comprise an acetylene glycol surfactant having 6 or more carbon atoms in the main chain thereof, and a polyoxyethylene phenyl ether having a polyoxyethylene moiety having a polymerization degree of 5 to 12.

(13) An ink set for use in an ink jet recording process as recited in any one of (1) through (12) above, characterized in that said ink A and/or B have a pH of 6 to 11.

(14) An ink jet recording method wherein an ink set comprising at least two aqueous inks A and B having different hues is used to form a color image and wherein said at least two aqueous inks A and B are superimposed on a recording medium to form an image thereon, characterized in that said ink set used is an ink set according to any one of (1) through (13) above.

(15) An ink jet recording method as recited in (14) above, characterized in that said recording medium has a Stockigt sizing degree of 3 or more seconds.

(16) An ink cartridge for ink jet recording, comprising ink containers containing an ink set, characterized in that said ink set is an ink set according to any one of (1) through (13) above.

(17) An ink jet recording apparatus comprising ink containers or an ink cartridge containing an ink set, characterized in that said ink set is an ink set according to any one of (1) through (12) above.

BEST MODE FOR CARRYING OUT THE INVENTION

Figure 1:
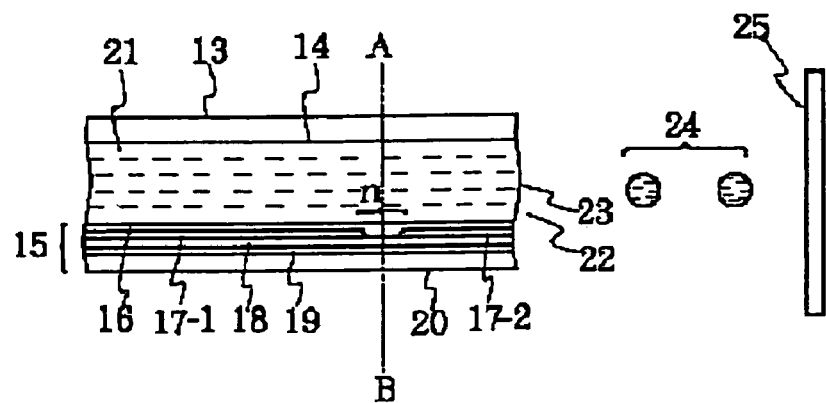
FIG. 1 is a cross-sectional view showing one embodiment of a recording head.

An ink jet recording process is widely adopted for forming a color image, in which at least two aqueous inks having different hues are superimposed to form a color image. When a color image is formed at a high speed on a recording medium such as plain paper by the above process and when the inks have high penetrativity into the paper, various troubles are caused as described previously. In the present invention, such troubles are avoided. Thus, even when a highly penetrative ink is used, it is possible to obtain an image having a high image density, high image clearness and minimized strike-through.

The term "ink set" as used herein is intended to refer to a combination of at least two inks having different hues. In this case, the inks are contained in a cartridge. Examples of the ink set include a combination of a black ink with at least one color ink selected from a yellow ink, a magenta ink and a cyan ink. The number of the inks may be two and, rest, three, four or more.

When a color image composed of at least two hues is produced by the ink set for ink jet recording (hereinafter also referred to simply as "ink set") according to the present invention, the image formation includes a procedure of superimposing at least two inks A and B by printing to form the color image on a recording medium such as paper. In this case, each ink contains a coloring agent corresponding to the hue thereof. The ink set according to the present invention comprises at least two inks A and B which contain coloring materials A and B, respectively. When the ink set is composed of three inks A, B and C, the inks A, B and C contain coloring materials A, B and C, respectively. When the ink set is composed of three inks A, B, C and D, the inks A, B, C and D contain coloring materials A, B, C and D, respectively.

When a color image is formed by superimposing at least two inks A and B of the ink set according to the present invention, in one ink A of the two inks A and B contains a coloring material A having an anionic group, while the other ink B contains a quaternary ammonium salt having at least one alkyl group which has 6 or less carbon atoms and which has a hydroxyl group.

The two inks A and B are compatible with each other so that, when the inks A and B are homogeneously mixed and maintained at 25° C. for 60 minutes, the coloring materials A and B form an aggregate. Such aggregation of the coloring materials A and B can be confirmed by the presence of precipitates upon a centrifugal treatment or by spectral analysis of the supernatant.

Because of the characteristics of the at least two inks A and B of the ink set according to the present invention, when a color image is formed by superimposing the inks A and B or when a color image is formed by printing the inks A and B in juxtaposition to each other, bleeding in the boundaries between colors of the inks can be prevented, and the color image has minimized strike-through, a high image density and high image clearness.

The coloring material A of the ink A of the present invention has an anionic group. Examples of the anionic group include a carboxylic acid group (COOH), a sulfonic acid group ($SO_3H$), a phosphoric acid group ($H_2PO_4$), a phosphonic acid group ($PO_3H_2$), a phenylsulfonic acid group ($—C_6H_4—SO_3H$) and a phenylcarboxylic acid group ($—C_6H_4COOH$). Above all, a carboxylic acid group and a sulfonic acid group are preferred. These anionic groups may be in the form of free acids or neutral salts. In the case of neutral salts, water-soluble salts such as sodium salts and potassium salts are preferred. The coloring material A may be, for example, an organic dye or a water-insoluble organic pigment.

The ink B used in the present invention contains a quaternary ammonium salt having at least one alkyl group which has a hydroxyl group and which has 6 or less, preferably 1 to 3, more preferably 1 or 2 carbon atoms. The coloring material B contained in the ink B may be, for example, a water-soluble dye, a water-insoluble pigment or dye, or colored fine particles.

The quaternary ammonium salt used in the present invention may be a compound represented by the following general formula (I):

wherein $R_1$, $R_2$, $R_3$ and $R_4$ are each an alkyl group having 6 or less carbon atoms, a halogenated alkyl group having 6 or less carbon atoms or a hydroxyalkyl group having 6 or less carbon atoms. At least one of $R_1$, $R_2$, $R_3$ and $R_4$ is a hydroxyalkyl group. $X^-$ represents a counter ion, such as a halide ion, a sulfate ion, a nitrate ion, a phosphate ion, a thiocyanate ion or an organic acid ion.

The alkyl group constituting the groups $R_1$, $R_2$, $R_3$ and $R_4$ has 1 to 6, preferably 1 to 3, more preferably 1 or 2 carbon atoms.

Preferably, the quaternary ammonium salt used in the present invention may be a compound represented by the following general formula (II), (III) or (IV):

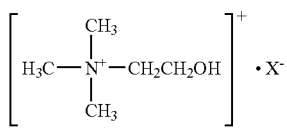
(II)

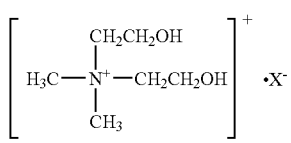
(III)

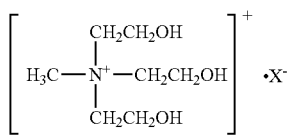
(IV)

wherein X represents a counter ion.

The preferred counter ion X⁻ is a nitrate ion or an organic acid ion. Examples of the organic acid ion include aliphatic acids having 1 to 6, preferably 2 or 3 carbon atoms, and those derived from hydroxycarboxylic acids having 2-6 carbon atoms. For reasons of safety, acetic acid or lactic acid is preferably used.

The amount of the quaternary ammonium salt contained in the ink B varies with the kind of the coloring material B, but is generally 0.1 to 10% by weight, preferably 0.5 to 5% by weight.

The amount of the coloring material contained in each of the inks of the present invention is generally in the range of 1 to 20% by weight, preferably 0.2 to 8% by weight. An amount of the coloring material below 0.1% fails to show color forming power even when the material is used for a light color ink. On the other hand, too large an amount in excess of 20% causes an increase of the viscosity so that a difficulty will be encountered in ejection thereof from a nozzle.

The coloring material contained in each of the inks of the present invention may be a water-soluble coloring material and/or a water-insoluble coloring material. A water-soluble dye may be used as the water-soluble coloring material. The water-soluble dye may be used as a mixture with another coloring material, if desired. Examples of the water-insoluble coloring material include inorganic pigments, organic pigments and fine particles whose surfaces are colored with a dye or a pigment. The average diameter of these coloring materials is 10 to 300 nm, preferably 60 to 120 nm. The fine particles whose surfaces are colored with a dye or a pigment to form a water-insoluble coloring material may be fine particles of a polymer or fine particles of a metal oxide such as silica fine particles or alumina fine particles.

By incorporating such fine particles in the ink, fixability and coloring efficiency of the ink on plain paper are improved. For reasons of gloss, polymer fine particles are preferred. It is particularly preferred to use fine particles of an acrylic polymer or a polyester impregnated with a dye or a pigment. The dye or pigment may be present in surface regions, inside regions or whole regions of the polymer fine particles. Specific examples of such fine particles include those prepared by a method disclosed in Japanese Unexamined Patent Publication No. 2000-53898.

In the inks A and/or B, the coloring materials A and/or B contained therein may a water-soluble dye having an anionic group. Such a dye may be an acidic dye, a basic dye, a reactive dye or a food dye.

Specific examples of the water-soluble dye having an anionic group are shown below in the form of a free acid:

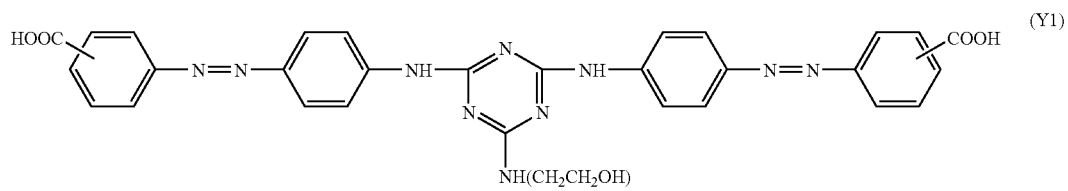
(Y1)

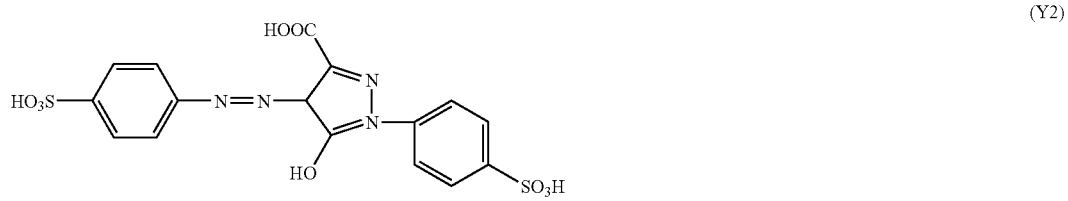
(Y2)

-continued
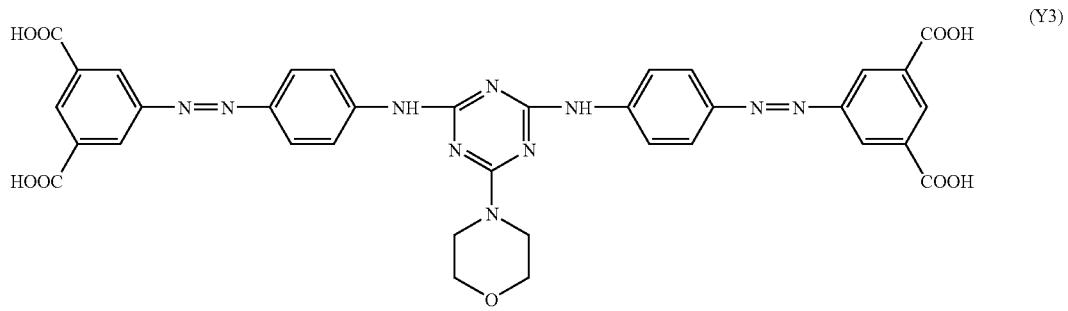
(Y3)
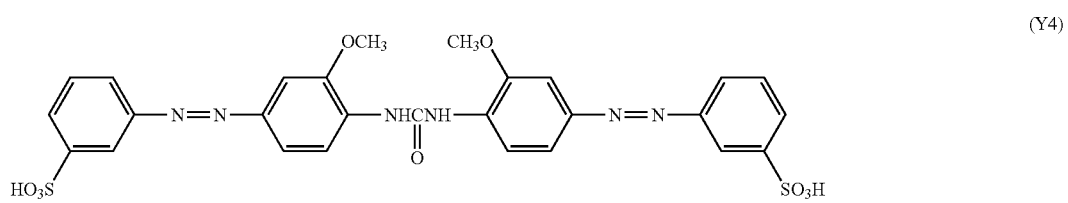
(Y4)
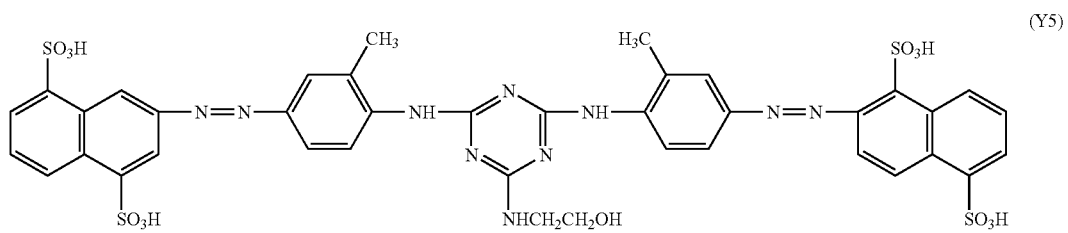
(Y5)
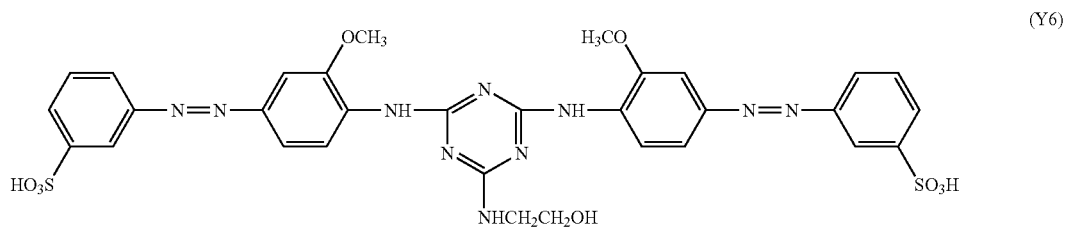
(Y6)
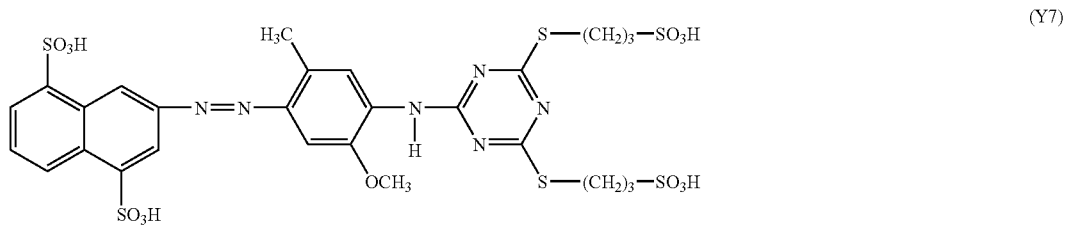
(Y7)
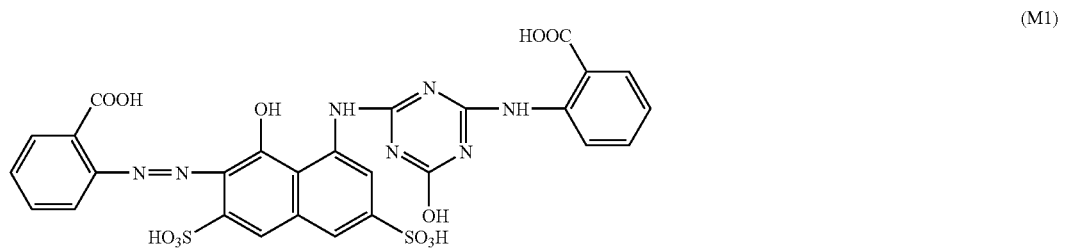
(M1)
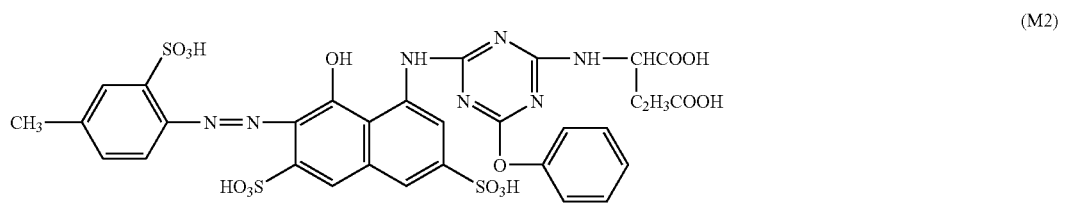
(M2)

-continued
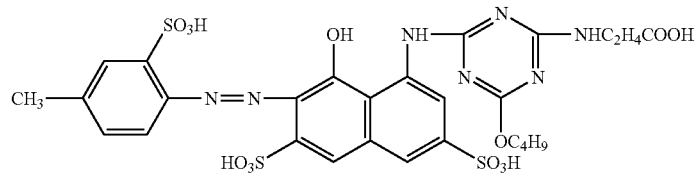
(M3)
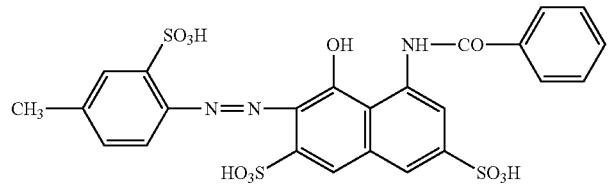
(M4)
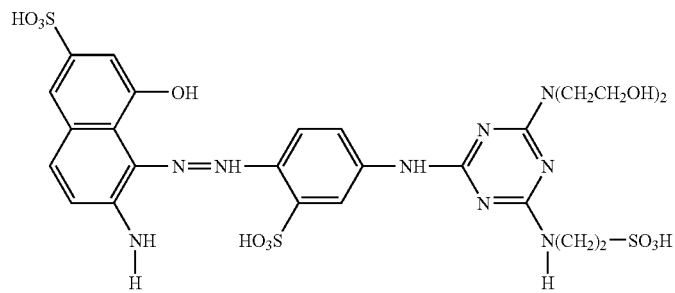
(M5)
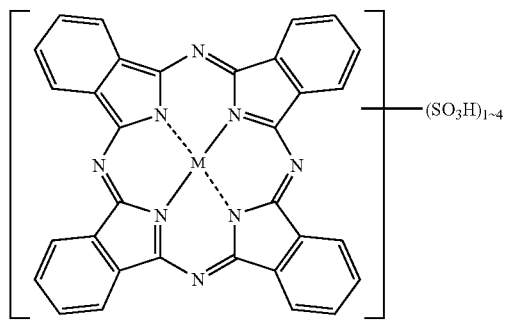
(C1)
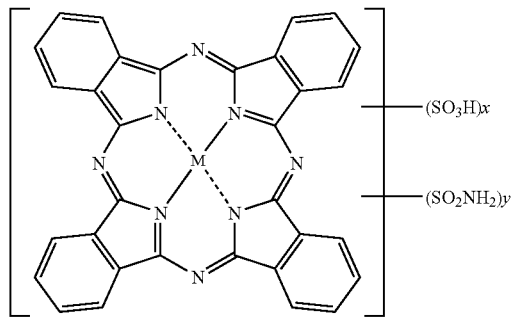
(C2)
X + Y = 2~4

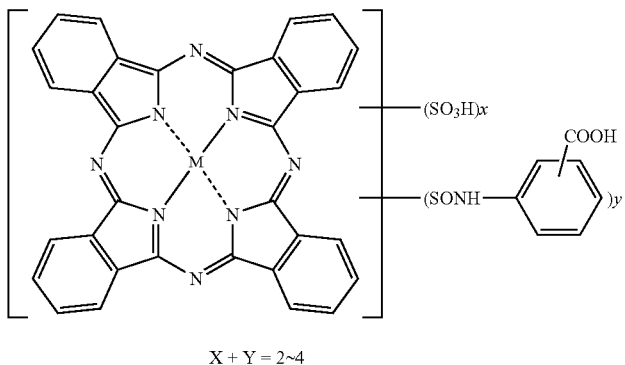

(C3)

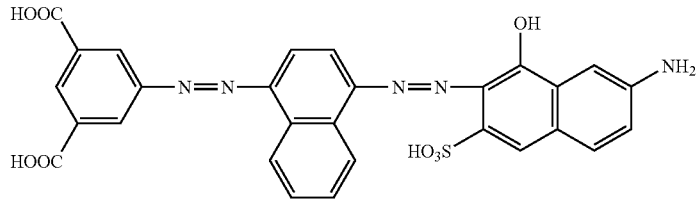

(Bk1)

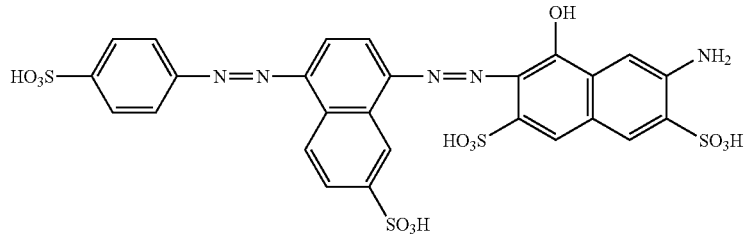

(Bk2)

The coloring material A contained in the ink A of the present invention may be a pigment having an anionic group. Suitable pigments include organic pigments such as azo pigments, phthalocyanine pigments, anthraquinone pigments, dioxazine pigments, indigo pigments, thioindigo pigments, perylene pigments, isoindolinone pigments, aniline black pigments, azomethine pigments, Rhodamine B lake pigments; and carbon black pigments.

The coloring material B contained in the ink B of the present invention may be a water-soluble dye. Any customarily employed water-soluble dyes with or without an anionic group may be used.

The water-soluble dye used as the coloring material B is preferably a dye having excellent waterproof property and light fastness and belonging to classes of acid dyes, direct dyes, basic dyes, reactive dyes and food dyes in the Color Index.

Specific examples of these dyes include as follows.

Acid Dyes and Food Dyes:

C. I. Acid Yellow 17, 23, 42, 44, 79 and 142,

C.I. Acid Red 1, 8, 13, 14, 18, 26, 27, 35, 37, 42, 52, 82, 87, 89, 92, 97, 106, 111, 114, 115, 134, 186, 249, 254 and 289, C. I. Acid Blue 9, 29, 45, 92 and 249, C. I. Acid Black 1, 2, 7, 24, 26 and 94, C. I. Food Yellow 3 and 4, C. I. Food Red 7, 9 and 14 and C. I. Food Black 1 and 2.

Direct Dyes:

C. I. Direct Yellow 1, 12, 24, 26, 33, 44, 50, 86, 120, 132, 142 and 144,

C. I. Direct Red 1, 4, 9, 13, 17, 20, 28, 31, 39, 80, 81, 83, 89, 225 and 227,

C. I. Direct Orange 26, 29, 62 and 102,

C. I. Direct Blue 1, 2, 6, 15, 22, 25, 71, 76, 79, 86, 87, 90, 98, 163, 165, 199 and 202 and C. I. Direct Black 19, 22, 32, 38, 51, 56, 71, 74, 75, 77, 154, 168 and 171.

Basic Dyes:

C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91, C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112, C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155 and C. I. Basic Black 2 and 8.

Reactive Dyes:

C. I. Reactive Black 3, 4, 7, 11, 12 and 17,

C. I. Reactive Yellow 1, 5, 11, 13, 14, 20, 21, 22, 25, 40, 47, 51, 55, 65 and 67, C. I. Reactive Red 1, 14, 17, 25, 26, 32, 37, 44, 46, 55, 60, 66, 74, 79, 96, 97 and 180 and C. I. Reactive Blue 1, 2, 7, 14, 15, 23, 32, 35, 38, 41, 63, 80 and 95.

Particularly preferably used for the purpose of the present invention are acid dyes and direct dyes. Further, dyes of the Projet (product name) series such as Projet Cyan 2, Projet Magenta 2, and Projet Yellow 2 produced by Avecia and developed as dyes for ink jet recording are also preferably used.

As the coloring material B, a dye having an anionic group may be used. Specific examples of the dye are those described above. Specific examples of the pigment used as the coloring material B include as follows.

Black:

Carbon black (C. I. Pigment Black 7) pigments such as furnace black, lamp black, acetylene black and channel black; metal pigments such as copper oxide and iron oxide (C. I. Pigment Black 11); and aniline black (C. I. Pigment Black 1);

Yellow:

C. I. Pigment Yellow 1 (Fast Yellow G), 3, 12 (Disazo Yellow AAA), 13, 14, 17, 24, 34, 35, 37, 42 (yellow iron oxide), 53, 55, 81, 83 (Disazo Yellow HR), 95, 97, 98, 100, 101, 104, 108, 109, 110, 117, 120, 138, 150 and 153;

Magenta:

C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (iron oxide red), 104, 105, 106, 108 (Cadmium Red), 112, 114, 122 (Quinacridone Magenta), 123, 146, 149, 166, 168, 170, 172, 177, 178, 179, 185, 190, 193, 209 and 219;

Cyan:

C. I. Pigment Blue 1, 2, 15 (Phthalocyanine Blue R), 15:1, 15:2, 15:3 (Phthalocyanine Blue G) 15:4, 15:6 (Phthalocyanine Blue E), 16, 17:1, 56, 60 and 63.

The following pigments may be used alone or in combination as intermediate coloring materials of red, green and blue:

C. I. Pigment Red 177, 194 and 224;

C.I. Pigment Orange 43;

C. I. Pigment Red 177, 194 and 224, C. I. Pigment Orange 43, C. I. Pigment Violet 3, 19, 23 and 37, C. I. Pigment Green 7 and 36.

As carbon black, there may be preferably used carbon black produced by a furnace method or a channel method and having a particle size of the primary particles of 15 nm to 40 nm, a specific surface area of 50 to 300 m$^2$/g according to the BET adsorption method, a DBP oil absorption of 40 to 150 ml/100 g and a volatile content of 0.5 to 10%.

The above-described pigment may be used in various forms such as in the form of a capsulated pigment and a polymer-grafted pigment for the purpose of improving dispersibility in water.

The pigment containing an anionic group may be obtained by treating anionic group-free carbon black or organic pigment such as those described above to introduce an anionic group thereinto. Any known anionic group-introducing method may be adopted for this purpose. For example, as a method of introducing a carboxylic acid group, there may be mentioned a method in which an organic carboxylic acid (such as nonochloroacetic acid) having a halogen group (such as chlorine or bromine) or a method in which an oxidizing treatment is carried out using nitric acid, hypochlorous acid, etc. As a method of introducing a sulfonic acid group, there may be mentioned a method in which a sulfonating agent such as sulfuric acid, fuming sulfuric acid or chlorosulfonic acid is reacted. As a method of introducing a phosphoric acid group, there may be mentioned a method in which phosphoric acid is reacted. Further, a reaction with diazonium compound can introduce a carboxylic acid group or a sulfonic acid group.

Examples of suitable carbon black for use in the present invention include carboxylic acid group-containing carbon black obtained by treatment with hypochlorous acid, sulfonic acid group-containing carbon black obtained by treatment with sulfonating agent, carboxylic acid group- or sulfonic acid group-containing carbon black obtained by treatment with a diazonium compound. The carbon black containing an anionic group in the form of free acid has a pH of 2 to 6, preferably 4 to 6.

The pH of a coloring material as used herein is intended to refer to a pH measured as follows. The coloring material (1 g) is added to 100 g of water. This is maintained at 25° C. for 60 minutes. Then, the pH of the water is measured.

In the case of a yellow organic pigment containing an anionic group such as a carboxylic acid group or a sulfonic acid group, the use of C. I. Pigment Yellow 74, 128 and 138, which does not contain a benzidinyl skeleton is preferred. In the case of a magenta pigment, quinacridone-based C. I. Pigment Red 122 and 209 are preferable. In the case of a cyan pigment, C. I. Pigment Blue 15:3 which is a phthalocyanine compound, aluminum-coordinated phthalocyanine and metal-free phthalocyanine are preferable. The pH of the organic pigment having an anionic group (as free acid form) is 2 to 6, preferably 4 to 6.

In the present invention, the pigment containing an anionic group may be used as so-called self-dispersion type pigment which has excellent dispersibility and is capable of being uniformly dispersed in water without using a dispersing agent such as a surfactant.

The pigment used in the present invention has an average particle diameter of 10 to 300 nm, preferably 40 to 120 nm, more preferably 60 to 110 nm.

Each of the inks for use in the present invention may be obtained by dissolving or dispersing a coloring material in water.

The ink containing a water-insoluble coloring material (coloring material dispersion) used in the present invention may be obtained by dispersing the coloring material in water. It is preferred that the ink contain a dispersing agent for uniformly dispersing the water-insoluble coloring material in water. As the dispersing agent, there may be used a polymer-type dispersing agent or a surfactant-type dispersing agent.

As the polymer-type dispersing agent, a hydrophilic polymer may be used. Examples of the hydrophilic polymer include:

natural polymers such as vegetable polymers (e.g. gum arabic, tragacanth gum, guar gum, karaya gum, locust bean gum, arabinogalactan, pectin and quince seed starch), seaweed polymers (e.g. alginic acid, carrageenan and agar), animal polymers (e.g. gelatin, casein, albumin and collagen), and microbial polymers (e.g. xanthan gum and dextran);

semisynthetic polymers such as cellulose polymers (e.g. methyl cellulose, ethyl cellulose, hydroxyethyl cellulose, hydroxypropyl cellulose and carboxymethyl cellulose), starch polymers (e.g. sodium starch glycolate and sodium starch phosphate) and seaweed polymers (e.g. sodium alginate and propylene glycol alginate); and pure synthetic polymers such as vinyl polymers (e.g. poly vinylalcohol, poly vinylpyrrolidone and polyvinylmethyl ether), acrylic resins (e.g. non-crosslinked polyacrylamide, polyacrylic acid and alkali metal salts thereof and water-soluble styrene acrylic resin), water-soluble styrene maleic acid resin, water-soluble vinylnaphthalene acrylic resin, water-soluble vinylnaphthalene maleic acid resin, polyvinylpyrrolidone, polyvinyl alcohol, alkali metal salt of β-naphthalenesulfonic acid formalin condensation product, high molecular weight compounds having salts of cationic functional groups such as quaternary ammonium and amino groups in their side chain, and natural high molecular weight compounds such as shellac.

A polymer-type dispersing agent having introduced thereinto carboxylic acid groups of a homopolymer or a copolymer containing a comonomer having other hydrophilic groups, such as acrylic acid, methacrylic acid or styrene-acrylic acid is preferably used.

As the surfactant-type dispersing agent, there may be used anionic surfactants such as polyoxyethylene alkyl ether phosphate and polyoxyethylene alkyl ether acetate, and nonionic surfactants such as nonylphenyl ether.

The polymer-type dispersing agent may be present in the ink in an amount of 0.5 to 10% by weight, preferably 1 to 5% by weight, while the surfactant-type dispersing agent may be present in an amount of 0.1 to 10% by weight, preferably 0.5 to 5% by weight.

In the case of the ink A having dispersed thereinto the water-insoluble coloring material A, it is preferred that a polymer-type dispersing agent be used as a dispersing agent. In the case of the ink B having dispersed thereinto the water-insoluble coloring material B, it is preferred that a surfactant-type dispersing agent be used as a dispersing agent.

In each of the inks used in the present invention, the wettability with a recording medium such as paper can be improved by containing a surfactant. Examples of the surfactants include polyoxyethylene alkyl ether acetate, dialkyl sulfosuccinate, polyoxyethylene alkyl ether, polyoxyethylene alkylphenyl ether, polyoxyethylene polyoxypropylene block copolymer and acetylene glycol based surfactants. Specific examples of the anionic surfactant include a polyoxyethylene alkyl ether acetate (a) represented by the following general formula (a) and/or C5-C7 branched chain-bearing dialkyl sulfosuccinate (b) represented by the following general formula (b):

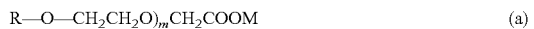
(a)

wherein R represents an alkyl group which has 6 to 14 carbon atoms and which may be branched, m is a number of 3 to 12 and M represents a salt forming cation such as an alkali metal ion, quaternary ammonium, quaternary phosphonium or alkanolamine;

(b)

wherein $R_5$ and $R_6$ each represent a branched alkyl group having 5 to 7 carbon atoms, and M represents a salt forming cation such as an alkali metal ion, quaternary ammonium, quaternary phosphonium or alkanolamine.

In the surfactants (a) and (b), excellent dissolution stability may be obtained when lithium ion, quaternary ammonium or quaternary phosphonium is used as the counter ion thereof.

Specific examples of preferable nonionic surfactants include polyoxyethylene alkylphenyl ether (c) represented by the general formula (c) shown below, and an acetylene glycol-based surfactant (d) represented by the general formula (d) shown below. When the two surfactants are used in combination, the penetration efficiency can be further improved.

In the present invention, it is preferred that a polyoxyethylene alkylphenyl ether (c) having a polyoxyethylene group having a polymerization degree of 5 to 12 be used in conjunction with an acetylene glycol-based surfactant having a main chain with at least 6, preferably 10-20 carbon atoms, for reasons of reduced bleeding at boundaries of colors and minimized blur of letters.

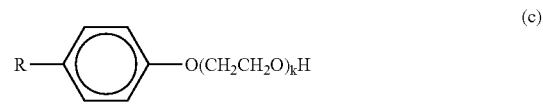
(c)

wherein R represents an alkyl group which has 6 to 14 carbon atoms and which may be branched, and k is a number of 5 to 12;

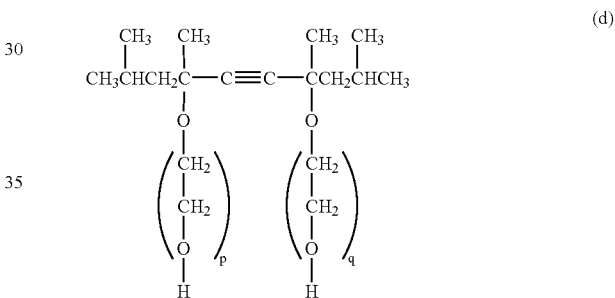
(d)

wherein p and q are each a number of 0 to 40.

When the above surfactants (a), (b), (c) and (d) are present in the ink in an amount of 0.05 to 10% by weight, desired penetration efficiency in ink characteristics as required in printer systems may be obtained. Too small an amount less than 0.05% by weight tends to cause bleeding in boundaries between two superposed colors, while to high an amount in excess of 10% by weight tends to cause precipitation of the surfactant at a low temperature and adversely affects the reliability.

Specific examples of the above surfactants (a) and (b) are shown below in their free acid forms:

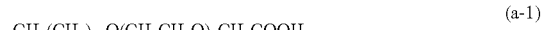
(a-1)

(a-2)

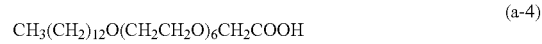
(a-3)

$CH_3(CH_2)_{12}O(CH_2CH_2O)_6CH_2COOH$ (a-4)

(a-5)

-continued

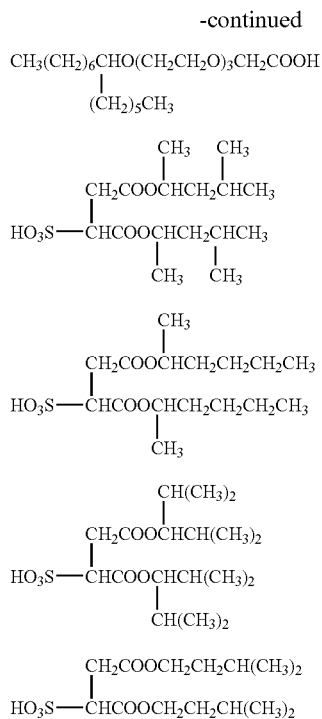

Each of the inks used in the present invention comprises water as a liquid medium. A water-soluble organic solvent may be used for the purpose of obtaining desired ink properties, preventing drying of the ink and improving the solution stability.

Specific examples of the water-soluble organic solvent include polyhydric alcohols such as ethylene glycol, diethylene glycol, triethylene glycol, polyethylene glycol, propylene glycol, dipropylene glycol, tripropylene glycol, tetraethylene glycol, hexylene glycol, polypropylene glycol, 1,5-pentanediol, 1,6-hexanediol, glycerol, 1,2,6-hexanetriol, 1,2,4-butanetriol, 1,2,3-butanetriol and Petriol; alkyl ethers of polyhydric alcohols such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monphenyl ether, and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone and ε-caprolactam; amides such as formamide, N-methylformamide, and N,N-dimethylformamide; amines such as monoethanol amine, diethanol amine, triethanol amine, monoethylamine, diethylamine and triethylamine; sulfur-containing compounds such as dimethyl sulfoxide, sulfolane, and thiodiethanol; propylene carbonate; ethylene carbonate; and γ-butylolactone. These solvents may be used alone or as a mixture.

Above all, preferably employed are diethylene glycol, thiodiethanol, polyethylene glycol (200 to 600), triethylene glycol, glycerol, 1,2,6-hexanetriol, 1,2,4-butanetriol, 1,3-pentanediol, 2,3-butanediol, 1,4-butanediol, 1,5-pentanediol, N-methyl-2-pyrrolidone, N-hydroxyethylpyrrolidone, 2-pyrrolidone and 1,3-dimethylimidazolidinone for reasons of high solubility and excellent effect for the prevention of ejection failure by water evaporation.

Particularly preferred solvent for obtaining good dispersion stability of the coloring materials is a pyrrolidone derivative such as N-hydroxyethyl-2-pyrrolidone.

For the purpose of adjusting the surface tension of the ink, there may be added the following penetration agents other than the above surfactants (a) through (d): alkyl and aryl ethers of polyhydric alcohols such as diethylene glycol monophenyl ether, ethylene glycol monophenyl ether, ethylene glycol monoallyl ether, diethylene glycol monobutyl ether, propylene glycol monobutyl ether, triethylene glycol monobutyl ether and tetraethylene glycol chlorophenyl ether; diols such as 2-ethyl-1,3-hexanediol, 2,2,4-trimethyl-1,3-pentanediol, 2,2-dimethyl-1,3,-propanediol; polyoxyethylene-polyoxypropylene block copolymers, fluorine-containing surfactants, and lower alcohols such as ethanol and 2-propanol. Especially preferred is diethylene glycol monobutyl ether as the polyhydric alcohol alkyl ether, and 2-ethyl-1,3-hexanediol and 2,2,4-trimethyl-1,3-pentanediol as the diol having at least 6 carbon atoms. Diols are suitable because aggregation of the water-insoluble coloring material is hard to occur. The amount of the penetration agent varies depending upon the kind thereof and the desired properties of the ink, but is in the range of 0.1 to 20% by weight, preferably 0.5 to 10% by weight. An amount of the penetration agent below 0.1% by weight is insufficient to provide satisfactory penetration efficiency, while too large an amount in excess of 20% by weight adversely affects liquid particles formation properties. The addition of the penetration agent can also improve wettability of the ink with a head member and other parts of the ink jet recording apparatus, so that the ink can be effectively filled in these parts to prevent printing failure due to bubbles.

The properties, such as surface tension, of the ink of the present invention can be adjusted as appropriate for the system. The surface tension of ink as used herein is an index that indicates the penetration efficiency thereof into paper. In particular, the penetration efficiency of the ink may be expressed in terms of the dynamic surface tension of the ink as measured within a short time of one or less second after the ink has been applied on a surface of the paper. Any method, such as one described in Japanese Unexamined Patent Publication No. 63-312372, may be suitably used for measuring the dynamic surface tension, as long as it can measure a dynamic surface tension within a period of one second or less. The surface tension is preferably 50 mN/m or less, more preferably 40 mN/m or less, for reasons of excellent drying efficiency. On the other hand, with regard to the stability of ejection of the ink, when the dynamic surface tension is too low, the formation of liquid particles tends to be unstable. The dynamic surface tension allowing stable ejection is preferably 40 mN/m or more at 1 ms.

The viscosity of the ink can be suitably selected from the range of 1 mPa·s and 10 mPa·s, depending on the ejection method.

The particle size of the pigment contained in the ink is preferably in the range of 10 nm to 300 nm, and the average particle size is preferably in the range of 60 nm to 120 nm. The solid content of the ink is preferably in the range from 1 to 25% by weight, and the water content is preferably in the range from 25 to 93% by weight, more preferably 50 to 80% by weight.

In the present invention, when the electric conductivity of each of the inks is in the range of 1 mS/cm to 6 mS/cm, the dispersion stability is not adversely affected for reasons of the zeta (ξ) electric potential of particles contained in pigment-containing ink or colored fine particles-containing ink. Thus, the ink is free of aggregation of the pigment, shows only a small change in particle size and can exhibit high reliability over long period of time. A conductivity adjusting agent is generally added to control the conductivity in the above-described range. However, since the quaternary ammonium salt contained in the ink B has a dissociation group, it is possible to control the conductivity in the desired range by adjusting the amount of the quaternary ammonium salt. For the purpose of fine adjustment of the conductivity, a conductivity adjusting agent may be additionally added, if the agent does not adversely affect the dispersion of the coloring material. Illustrative of suitable conductivity adjusting agent are quaternary ammonium salts such as tetramethylammonium chloride, and alkanolamine salts.

The ink of the present invention may contain conventionally known additives. For example, as an antiseptic or an antifungal agent, sodium dehydroacetate, sodium sorbate, sodium 2-pyridinethiol-1-oxide, sodium benzoate, sodium pentachlorophenolate or isothiazoline can be used.

As a pH adjusting agent, any substance can be used, as long as it can adjust the pH to a desired range without adversely affecting the ink. Illustrative of suitable pH controlling agents are amines such as diethanolamine and triethanolamine, hydroxides of alkali metal elements such as lithium hydroxide, sodium hydroxide and potassium hydroxide, ammonium hydroxide, quaternary ammonium hydroxide, quaternary phosphonium hydroxide, and carbonates of alkali metals such as lithium carbonate, sodium carbonate and potassium carbonate.

As a chelating reagent, there may be mentioned, for example, sodium ethylenediamine tetraacetate, sodium nitrilotriacetate, sodium hydroxyethylethylenediamine-triacetate, sodium diethylenetriaminepentaacetate or sodium uramil diacetate.

As a rust-preventive agent, there may be mentioned, for example, acid sulfites, sodium thiosulfate, ammonium thiodiglycolate, diisopropyl ammonium nitrite, pentaerythritol tetranitrate or dicyclohexylammonium nitrite.

Other additives such as a water-soluble ultraviolet absorbing agent or a water-soluble infrared absorbing agent can be added, as desired.

The ink set according to the present invention comprises at least two inks A and B as described above. When the ink set is composed of two inks, one of them is the ink A and the other is the ink B. When the ink set is composed of three inks, one of them is the ink A and another is the ink B. The remaining ink may be an ink containing a coloring material having an anionic group similar to the in A or an ink containing a quaternary ammonium salt similar to the ink B. Alternatively, the remaining ink may be an ink belonging to a class different from those of the inks A and B. When the ink set is composed of four inks, one of them is the ink A and another is the ink B. One of the remaining two inks may be an ink containing a coloring material having an anionic group similar to the in A and the other may be an ink containing a quaternary ammonium salt similar to the ink B. Alternatively, each of the remaining two inks may be an ink containing a coloring material having an anionic group similar to the in A, or an ink containing a quaternary ammonium salt similar to the ink B. Further, each of the remaining two inks may be an ink belonging to a class different from those of the inks A and B.

It is preferred that the ink A of the ink set according to the present invention be a black ink containing a self-dispersion type coloring material which comprises anion group-bearing carbon, or a color ink containing a self-dispersion type coloring material which comprises an anion group-bearing organic pigment. The coloring material B of the ink B is preferably fine particles colored with a dye or a pigment.

The ink set of the present invention is used for an customarily employed ink jet recording apparatus in which an ink of the ink set is jetted from a printing nozzle in the form of fine liquid droplets by thermal energy or mechanical energy and is allowed to deposit on a recording medium, thereby to form an image. It is preferred that the recording medium have Stockigt sizing degree of 3 seconds or more, more preferably 10 seconds or more, according to the test method of JIS P-8122. The upper limit of the Stockigt sizing degree is generally about 100 seconds.

The properties of the ink used in the present invention can be controlled by control of the pH thereof. When the pH of the ink is 6 or more, the ink exhibits good storage stability. Copying papers or letter papers used in offices generally have a pH of 5 or 6 and are so-called plain paper having a Stockigt sizing degree of 3 seconds or more according to the test method of JIS P-8122. When the ink is jetted at a speed of 5 to 20 m/s in the form of droplets having an ejection weight of 2 ng to 50 ng from a fine nozzle with a diameter of 9 to 60 μm on the above plain paper with an adhered amount of a single color of 1.5 $g/m^2$ to 30 $g/m^2$, high quality and high resolution images can be obtained by the above recording method. However, when the pH is 9 or more, the properties may be changed easily by degradation of the previously described surfactant (b) during storage. Thus, it is preferred that the pH of the recording medium be 6 to 9 when the surfactant (b) is used.

Next, an example of an ink jet recording apparatus of suitable for recording with the above mentioned aqueous ink of the present invention will be described.

First, reference is made to FIG. 1 illustrating an example of the constitution of a head, which is the main part of an ink jet recording apparatus utilizing thermal energy. FIG. 1 is a cross-sectional view taken along an ink channel of a head 13. The head 13 can be prepared by fixing or adhering a glass, a ceramic, a silicon, or a plastic plate having a channel (nozzle) 14 to drive out an ink, to a heater element substrate 15. The heater element substrate 15 includes a protective layer 16 formed of silicon oxide, silicon nitride, silicon carbide or the like; electrodes 17-1 and 17-2 formed of aluminum, gold, an aluminum-copper alloy or the like; a heat-generating resistor layer 18 formed of a material having a high melting point such as $HfB_2$, TaN, TaAl or the like; a heat storage layer 19 formed of thermally oxidized silicon oxide, aluminum oxide or the like; and a substrate 20 formed of a material having good radiation properties such as silicon, aluminum, aluminum nitride or the like.

When an electric signal in the form of pulses is applied to the electrodes 17-1 and 17-2 of the head 13, that region of the radiation element substrate 15 which is shown by n is rapidly heated to form bubbles in the ink 21 which is in contact with that region. As a consequence, the meniscus 23 is projected by the pressure. Thus, the ink 21 is ejected through the nozzle 14 of the head and is jetted from an orifice 22 toward a recording medium 25 in the form of droplets 24.

Figure 2:
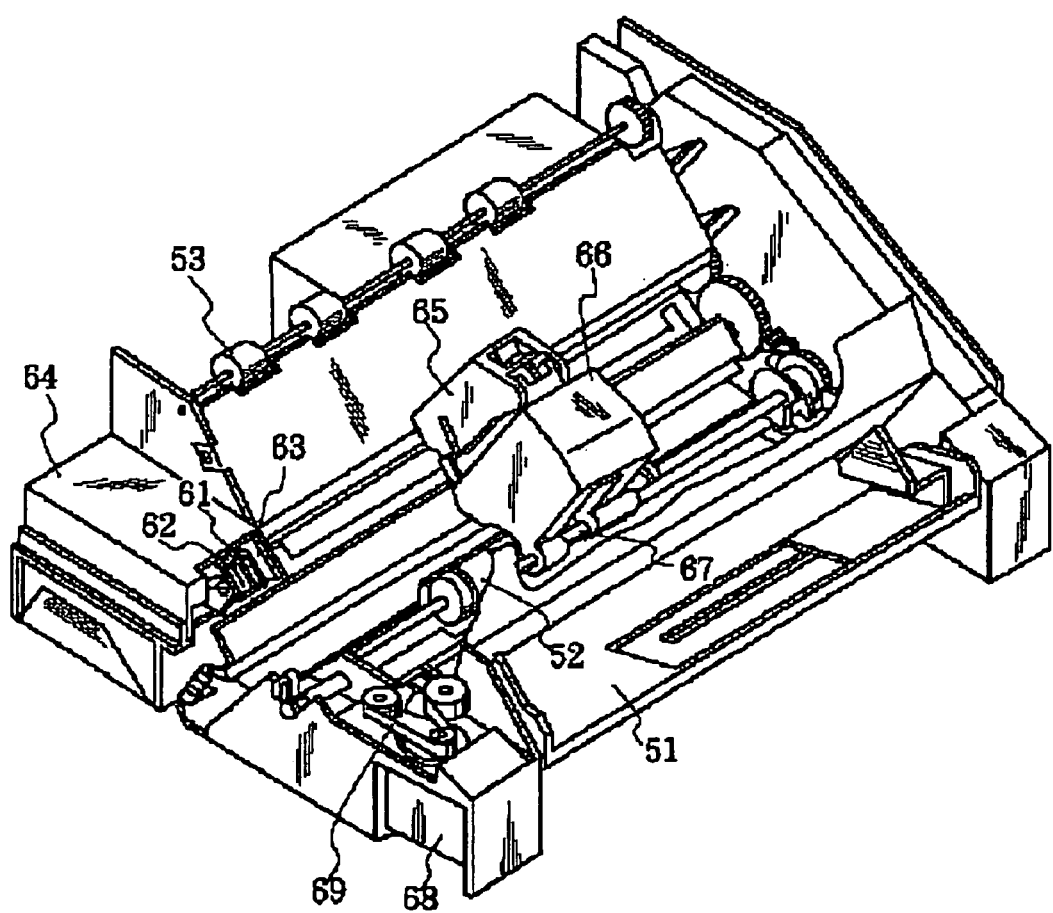
FIG. 2 is a perspective view showing one embodiment of an ink jet recording apparatus.

FIG. 2 depicts an example of an ink jet recording apparatus to which above mentioned head is incorporated. In FIG. 2, designated as 61 is a blade serving as a wiper member. The blade has one end fixedly secured to a blade holding member in cantilever fashion. The blade 61 is located at a position adjacent to a recording area of the recording head 65. In the illustrated embodiment, the blade 61 is held for projecting into a path along which the recording head 65 travels.

The reference numeral 62 designates a cap 62 for a projected face of the recording head 65. The cap 62 is disposed in a home position adjacent to the blade 61. The cap is configured to move in the direction perpendicular to the moving direction of the recording head 65 and to be in engagement with the ink outlet face of the head for capping same. An ink absorbing member 63 is provided adjacent to the blade 61 and is held for projecting in the traveling path of the recording head 6), similar manner to the blade 61. The blade 61, the cap 62 and the ink absorbing member 63 constitute an ejection recovery section 64. Moistures, dusts and the like on the ink outlet face are removed by the blade 61 and the ink absorbing member 63.

The reference numeral 65 designates the recording head having an energy generating means for ejecting the ink toward the recording medium located opposite to the outlet face provided with an outlet. The recording head 65 is mounted on a carriage 66 and is moved thereby. The carriage 66 is slidably engaged with a guide axis 67 and has a part connected to a belt 69 driven by a motor 68 (not shown). Thus, the carriage 66 can be moved along the guide axis 67 so that the recording head can move in the recording area and an adjacent portion thereof.

Designated as 51 is a paper feed section into which the recording medium is inserted. Designated as 52 is a paper feeder roller driven by a motor (not shown). With this construction, the recording medium can be fed to a position opposite to the outlet face of the recording head 65, and is conveyed to a paper delivery section provided with a paper delivery roller 53 as the recording proceeds. In the above construction, when the recording head 65 is returned to the home position after termination of the recording, the cap 62 of the ejection recovery section 64 is in a retracted position from the traveling path of the recording head 65, whereas the blade 61 projects into the traveling path, so that the outlet of the recording head 65 is wiped.

When the cap 62 is engaged by the outlet face of the recording head 65 for capping, the cap 62 moves so as to project into the traveling path of the recording head 65. When the recording head 65 moves from the home position to the record initiating position, the cap 62 and the blade 61 are located in the same positions as those for wiping as described above. Therefore, also during this movement of the recording head, the outlet face of the recording head 65 can be wiped. The recording head moves to the home position not only at the end of recording or for ejection recovery, but also the recording head returns at a predetermined interval to the home position adjacent to the recording area during its movement in the recording area for recording. The recording head is wiped also upon its return to the home position.

Figure 3:
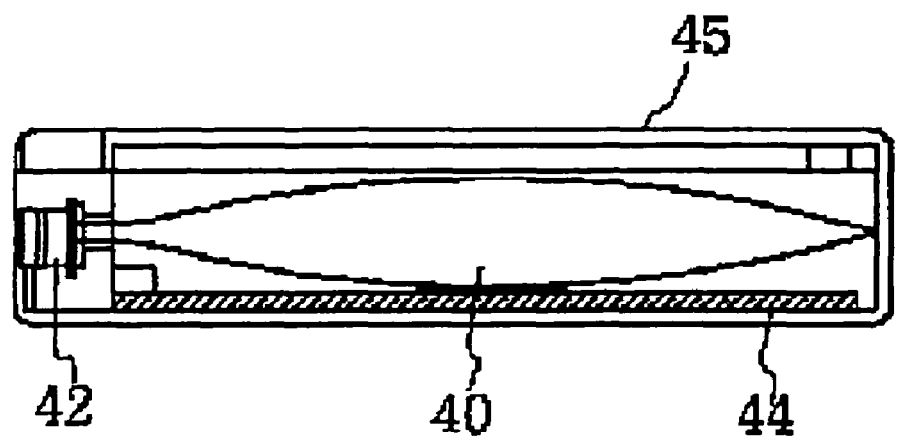
FIG. 3 is a cross-sectional view showing one embodiment of an ink cartridge accommodating.

FIG. 3 illustrates an embodiment of an ink cartridge containing an ink to be supplied to the recording head via an ink feed member such as a tube. Designated as 40 is an ink reservoir, for example, an ink bag, containing an ink to be supplied. The ink bag 40 has an end provided with a rubber stopper 42. The ink in the ink bag 40 can be supplied to the head through a needle (not shown) inserted into the stopper 42. Designated as 44 is an ink absorber member for receiving a waste ink. It is preferred that the surface to be contacted with the ink of the ink reservoir be formed of a polyolefin, particularly polyethylene.

Figure 4:
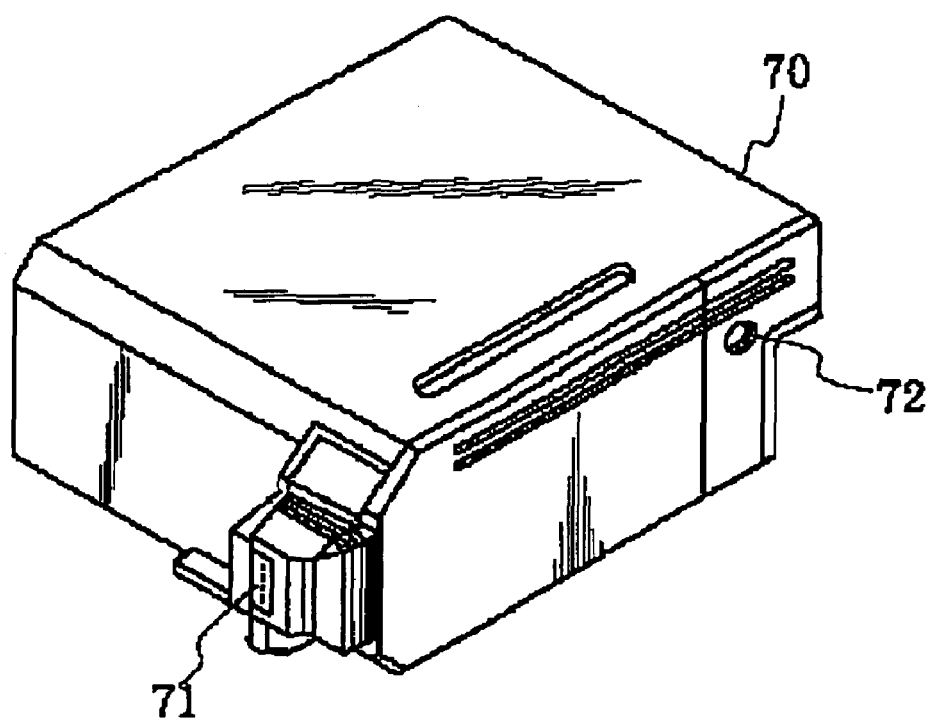
FIG. 4 is a perspective view showing another embodiment of an ink cartridge.

In the above described embodiment, the head and the ink cartridge are in separated. However, as shown in FIG. 4, the ink jet recording apparatus of the present invention can be constructed into a structure in which they are integrated into one unit. In FIG. 4, designated as 70 is a recording unit in which an ink reservoir, such as an ink absorbing member, containing an ink is accommodated. The apparatus is configured such that the ink in the ink absorber member is ejected in form of droplets from a head portion 71 having a plurality of orifices. It is preferred in the present invention that the ink absorber member be formed of polyurethane, cellulose; polyvinyl acetate or polyolefin based resin. Alternatively, instead of using the ink absorber member, an ink bag having a spring disposed therewithin can be used as the ink reservoir. The reference numeral 72 designates an air communicating port through which the outside atmosphere is in communication with the inside of the cartridge. The recording unit 70 is removable attached to the carriage 66 and is used instead of the recording head 66 shown in FIG. 2.

As another preferable example of the ink jet recording apparatus utilizing dynamic energy, there may be mentioned an on-demand ink jet recording apparatus including a nozzle forming substrate having a plurality of nozzles, a pressure generating element provided opposite to the nozzles and composed of a piezoelectric material and a conductive material, and an ink filled in a space around the pressure generating element. In this apparatus, a voltage is applied to displace the pressure generating element, so that the ink is ejected in the form of small droplets from the nozzles. An example of the constitution of the recording head, which is a main part of the recording apparatus is shown in FIG. 5.

The head includes an ink channel 80 in fluid communication with an ink chamber (not shown), an orifice plate 81 for ejecting a desired volume of ink droplets, a vibration plate 82 for applying a pressure directly to the ink, a piezoelectric element 83 bonded to the vibration plate 82 and displaced upon receipt of an electric signal, and a substrate 84 for supportingly securing the orifice plate 81, the vibration plate 82, etc.

Figure 5:
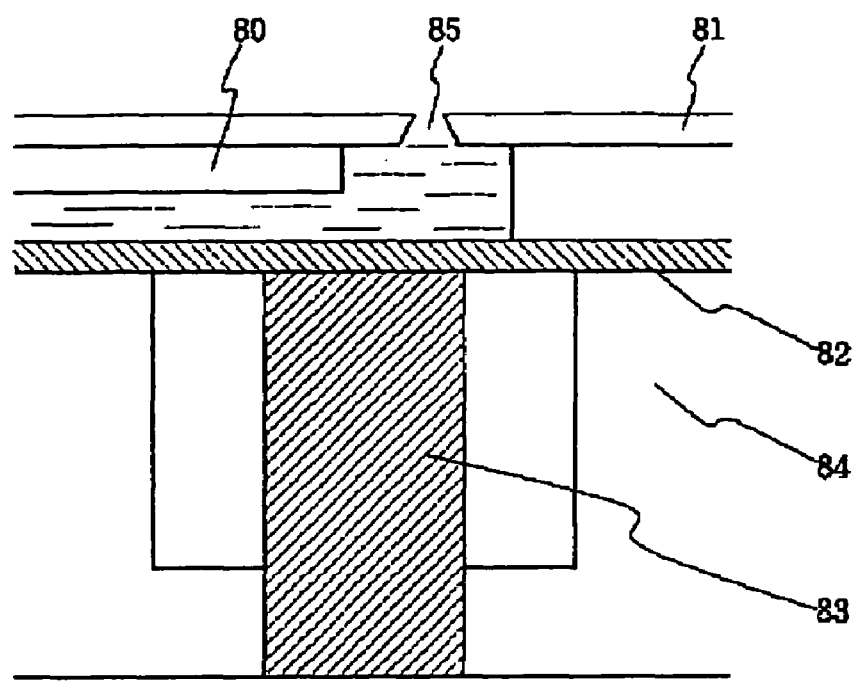
FIG. 5 is a cross-sectional view showing one embodiment of a recording head.

In FIG. 5, the ink channel 80 is formed of a photosensitive resin or similar material. The orifice plate 81 is provided with an ink outlet 85 formed by perforating a metal such as stainless steel or nickel using electroplating or press working and has a surface provided with an ink-repellant layer formed by eutectic plating of PTFE nickel. The vibration plate 82 is formed from a metal film of stainless steel, nickel, titanium or the like, and a high modulus resin film or the like. The piezoelectric device 83 is formed of a dielectric material such as barium titanate or PZT. The recording head having the above constitution operates in the following manner. A pulsed voltage is applied to the piezoelectric device 83 to generate a distortion stress. This energy causes deformation of the vibrating plate bonded to the piezoelectric device 83. Thus, the ink in the ink channel 80 is pressed vertically so that ink droplets (not shown) are ejected from the ink outlet 85 of the orifice plate 81 for recording. The above recording head may be incorporated into an inkjet recording apparatus as shown in FIG. 4 for use. The operation of the other components of the inkjet recording apparatus may be the same as in the above example.

Figure 6:
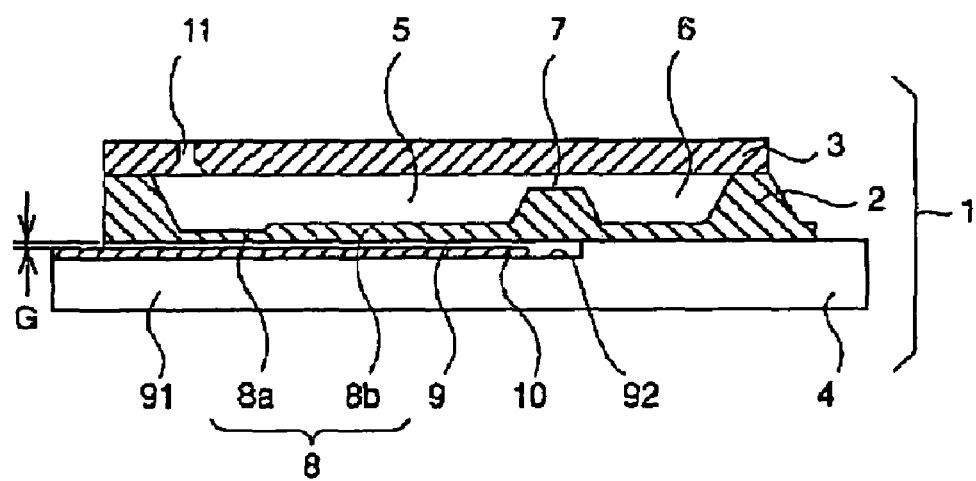
FIG. 6 is a plan view of an ink jet.

As a further preferred embodiment of the ink jet recording apparatus utilizing dynamic energy, an ink jet apparatus using an electrostatic actuator will be described. FIG. 6 is a cross-sectional view of an ink jet head to which the present invention is applied. As shown in FIG. 6, an inkjet head 1 has a three layer structure in which a silicon substrate 2 is sandwiched between an upper, nozzle plate 3 made of silicon and a lower, boron silicate glass substrate 4 having a coefficient of thermal expansion close to that of the silicon. In the central silicon substrate 2, grooves are formed by etching from a surface (the upper side in FIG. 6) to define a plurality of independent ink chambers 5, a common ink chamber 6 for these ink chambers and an ink feed paths 7 for connecting the common ink chamber 6 to the plurality of ink chambers 5. These grooves are covered with the nozzle plate 3 to define these portions 5, 6 and 7.

Ink nozzles 11 are provided in the nozzle plate 3 at positions corresponding to front end portions of respective ink chambers 5 for fluid communication with respective corresponding ink chambers 5. The ink plate 3 is also provided with an ink feed port in communication with the common ink chamber 6. The ink is fed from an external ink tank (not shown) to the common ink chamber 6 through the ink feed port. The ink fed to the common ink chamber 6 is then passed to the independent ink chambers 5 through the ink feed paths 7.

The ink chambers 5 each have a bottom wall 8 which is thin enough to function as a diaphragm elastically displaceable vertically in FIG. 6. Thus, this portion of the bottom wall 8 is also referred to as "diaphragm" for convenience in the following description.

The glass plate 4 which is in contact with the lower side of the silicon substrate 2 has an upper surface (at which the glass plate is contacted with the silicon substrate 2) provided with a shallow etched recess 9 at a position corresponding to respective ink chambers 5. Thus, the bottom wall 8 of each of the ink chambers 5 is opposed to a surface 92 of the recess 9 of the glass substrate 4, with a very small gap being defined therebetween. Since the recess 9 of the glass substrate 4 faces the bottom walls 8 of the ink chambers 5, the glass substrate 4 may be also referred to as "vibration plate opposing wall" or simply "opposing wall" 91.

The bottom wall 8 of each of the ink chambers 5 serves to function as an electrode for storing electric charges. A segment electrode 10 is provided on the surface 92 of the recess 9 of the glass substrate 4 at a position opposite to the bottom wall 8 of each of the ink chambers 5. The surface of each of the segment electrodes 10 is covered with an insulating layer having a thickness of G and made of inorganic glass. Thus, each of the segment electrodes 10 and the bottom wall 8 of the corresponding ink chamber constitute opposing electrodes (a distance between the electrodes is G) with the insulating layer 9 being interposed therebetween.

EXAMPLES

The present invention will be next described by way of examples but is not limited by the examples. In the examples, % is by weight.

Ink preparation examples will be first described.

Preparation Example 1

Carbon Black Dispersion Liquid (1) Treated with Hypochlorous Acid:

300 Grams of commercially available acidic carbon black having pH of 2.5 (manufactured by Cabot Corporation, trade name: MONARCH 1300) were mixed sufficiently in 1000 ml of water, to which 450 g of sodium hypochlorite (effective chlorine concentration: 12%) were added dropwise. The mixture was then stirred at 100 to 105° C. for 8 hours. Then, 100 g of sodium hypochlorite (effective chlorine concentration: 12%) were further added to the reaction liquid and the mixture was dispersed with a lateral type dispersing machine for 3 hours. The resultant slurry was diluted with water by a factor of 10, and the pH was adjusted with lithium hydroxide, followed by desalination and concentration using an ultrafiltration membrane until an electric conductivity of 0.2 mS/cc was reached, thereby obtaining a carbon black dispersion liquid having a pigment concentration of 15%. This was centrifuged to remove large particles and then filtered through a 1 μm nylon filter to obtain Carbon Black Dispersion Liquid 1 whose surfaces contained carboxylic acid groups. The total content of Fe, Ca and Si was 100 ppm or less according to ICP measurement. The concentration of chlorine ions was 10 ppm or less. The average particle size (D50%) measured by the Microtrack UPA was 95 nm.

Preparation Example 2

Carbon Black Dispersing Liquid 2 Treated with Sulfonating Agent:

150 Grams of commercially available carbon black pigment (manufactured by Degussa Corporation, trade name of PRINTEX #85) were mixed sufficiently in 400 ml of sulfolan, and the mixture was dispersed minutely by a ball mill. Then, 15 g of amidosulfuric acid were added to the mixture, followed by stirring at 140 to 150° C. for 10 hours. The resultant slurry was poured into 1000 ml of ion exchanged water and subjected to centrifugation at 12000 rpm so that a surface-treated carbon black wet cake was obtained. This carbon black wet cake was dispersed again in 2000 ml of ion exchanged water, and the pH was adjusted with lithium hydroxide, followed by desalination and concentration with an ultrafiltration membrane. Thus, a carbon black dispersing liquid having a pigment concentration of 10% was obtained. This liquid was filtered through a 1 μm nylon filter to obtain Carbon Black Dispersion Liquid 2 whose surfaces contain sulfonic acid groups. The total content of Fe, Ca and Si was 100 ppm or less according to ICP measurement. The concentration of sulfuric acid ions was also 100 ppm or less. The average particle size was 80 nm.

Preparation Example 3

Carbon Black Dispersion Liquid 3 Treated with Diazo Compound:

100 Grams of carbon black having a surface area of 230 $m^2/g$ and a DBP oil absorption of 70 ml/100 g and 34 g of p-amino-N-benzoic acid were mixed and dispersed in 750 g of water, to which 16 g of nitric acid were added dropwise with stirring at 70° C. After five minutes holding, a solution of 11 g of sodium nitrite dissolved in 50 g of water was added to the reaction mixture, followed by further stirring for one hour. The resultant slurry was diluted by a factor of 10, and subjected to centrifugation to remove large particles. The pH was adjusted to 8 to 9 with diethanolamine, followed by desalination and concentration with an ultrafiltration membrane. Thus, a carbon black dispersion liquid having a pigment concentration of 15% was obtained. This liquid was filtered through a 0.5 μm polypropylene filter to obtain Carbon Black Dispersion Liquid 3 whose surfaces contained phenylcarboxylic acid groups. The total content of Fe, Ca and Si was 100 ppm or less according to ICP measurement. The concentration of nitric acid ions was 10 ppm or less. The average particle size was 99 nm.

Preparation Example 4

Carbon Black Dispersing Liquid 4 Treated with Diazo Compound:

202 Grams of carbon black having a surface area of 230 $m^2/g$ and a DBPA of 70 ml/100 g were mixed in a solution of 43 g of sulfanilic acid dissolved in 2 liters of water at about 70° C. with stirring. The mixture was allowed to cool to room temperature with stirring, to which were then added 26.2 g of concentrated nitric acid and subsequently 20.5 g of aqueous solution containing 20.5 g of sodium nitrite to form 4-sulfobenzenediazonium hydroxide inner salt which reacted with the carbon black with stirring until bubble formation was ceased. The resultant slurry was diluted and the pH was adjusted to 8 to 9 with lithium hydroxide. This was centrifuged to remove large particles, followed by desalination and concentration with an ultrafiltration membrane. Thus, a carbon black dispersion liquid having a pigment concentration of 15% was obtained. This liquid was filtered through a 1 μm polypropylene filter to obtain Carbon Black Dispersion Liquid 4 whose surfaces contained phenylsulfonic acid groups. The total content of Fe, Ca and Si was 100 ppm or less according to ICP measurement. The concentration of nitric acid ions was 50 ppm or less. The average particle size was 95 nm.

Preparation Example 5

Dispersion Liquids of Color Pigments Having Surfaces Containing Carboxylic Acid Groups (Yellow Dispersion Liquid 1, Magenta Dispersion Liquid 1, Cyan Dispersion Liquid 1):

As a yellow pigment, a pigment containing a carboxylic acid group was prepared by treating C. I. Pigment Yellow 128 with low temperature plasma. The pigment was dispersed in ion exchanged water and the dispersion was subjected to desalination and concentration with an ultrafiltration membrane to obtain Yellow Pigment Dispersion Liquid 1 having a pigment concentration of 15%. The average particle size was 70 nm, and the total content of Fe, Ca and Si was 100 ppm or less.

In the same manner as above, Magenta Dispersion Liquid 1 having a pigment concentration of 15% was prepared using C. I. Pigment Magenta 122 as a magenta pigment. The average particle size was 60 nm, and the total content of Fe, Ca and Si was 100 ppm or less.

In the similar manner, Cyan Dispersion Liquid 1 having a pigment concentration of 15% was prepared using C.I. Pigment Cyan 15:3 as a cyan pigment. The average particle size was 80 nm, and the total content of Fe, Ca and Si was 100 ppm or less.

Preparation Example 6

Pigment Dispersion Liquids Using Dispersing Agent (Dispersion Using Surfactant: Yellow Dispersion Liquid 2, Magenta Dispersion Liquid 2, Cyan Dispersion Liquid 2; Dispersion Using Polymer: Yellow Dispersion Liquid 3, Magenta Dispersion Liquid 3, Cyan Dispersion Liquid 3):

Yellow pigment: C.I. Pigment Yellow 128
Magenta pigment: C.I. Pigment Red 122
Cyan pigment: C.I. Pigment Blue 15:3
Dispersing agent A: nonionic surfactant manufactured by Kao Corporation, EMULGEN 913), HLB: 15.5
Dispersing agent B: aqueous acrylic resin solution manufactured by Johnson Polymer, JONCRYL 611 (neutralized with ammonia, solid content of 20%), acid value: 57

(1) Salt Milling Pulverization

In a 1 gallon kneader made of stainless steel (manufactured by Inoue Seisakusho Co. Ltd.), 250 parts of the above pigment, 2500 parts of sodium chloride and 200 parts of diethylene glycol were charged and kneaded for 3 hours. The resulting mixture was then poured into 2.5 liters of hot water, and was stirred with a high-speed mixer for about 1 hour while being heated at about 80° C. to form a slurry. This was subjected to repeated filtration and washing (total five times) to remove sodium chloride and the solvent, thereby to obtain a dried pigment product.

(2) Surface Treatment

20 Parts of the resulting pigment, 5 parts (in terms of solid content) of the above Dispersing agent A or B and 75 parts of water were added to a paint conditioner and the mixture was dispersed for 3 hours. The resultant aqueous pigment dispersion was subjected to centrifugation at 15000 rpm for 6 hours.

To 20 parts of the thus surface-treated pigment, 0.1 part of 30% ammonia water and 79.9 parts of purified water were added and the resulting mixture was dispersed again in the paint conditioner to obtain a concentrated pigment liquid. To 20 parts of the pigment that had not been subjected to the surface treatment, 5 parts (in terms of solid content) of the Dispersants B and 75 parts of purified water were added. The resulting mixture was dispersed in the paint conditioner, followed by purification with a reverse osmosis membrane. Thus, a concentrated recording liquid for ink jet was prepared.

Each of the concentrated liquids was filtered through a 1 μm nylon filter and further filtered through a 0.5 μm polypropylene filter to provide a dispersion liquid for use. The content of Fe, Ca, and Si in each of the dispersion liquids was 100 ppm or less. The average particle diameter of the dispersion liquids were as follows:

| | |
|---|---|
| Yellow Dispersion Liquid 2: | 93 nm |
| Yellow Dispersion Liquid 3: | 80 nm |
| Magenta Dispersion Liquid 2: | 60 nm |
| Magenta Dispersion Liquid 3: | 56 nm |
| Cyan Dispersion Liquid 2: | 90 nm |
| Cyan Dispersion Liquid 3: | 87 nm. |

By using fine particles, whose surfaces are colored with a dye or a pigment, as the coloring material B of the ink B in the present invention, the fixability and coloring efficiency of the ink on plain paper may be further improved. The fine particles may be polymer fine particles or inorganic fine particles such as silica or alumina. For reasons of gloss, polymer fine particles are preferably used. One specific example of the fine colored particles is one prepared by a method disclosed in Japanese Unexamined Patent Publication No. 2000-53898. The example shown below is in accordance with such a method.

Preparation Example 7

In a hermetically sealable reaction vessel equipped with a stirring blade, a condenser and a nitrogen gas feed tube, 20 parts of methyl ethyl ketone as a polymerization solvent and the composition shown below containing polymerizable unsaturated monomers as an initial feed and a polymerization chain transfer agent were charged, and sufficient purge with nitrogen was performed (parts are by weight).

| | |
|---|---|
| Methyl methacrylate, monomer | 12.8 parts |
| 2-Hydroxyethyl methacrylate, monomer | 1.2 parts |
| Methacrylic acid, monomer | 2.9 parts |
| Silicone macromer (Chisso Corporation, FM-0711) | 2 parts |
| Styrene-acrylonitrile macromer (Toagosei Co., Ltd., AN-6) | 1 part |
| Mercaptoethanol (polymerization chain transfer agent) | 0.3 part |

The liquid in the reaction vessel was heated to 65° C. with stirring in a nitrogen atmosphere.

Besides, the composition shown below containing monomers for dripping feed and a polymerization chain transfer agent was mixed with 60 parts of methyl ethyl ketone, and 0.2 part of 2,2'-azobis(2,4-dimethyl valeronitrile), and sufficient purge with nitrogen was performed. The mixture thus obtained was gradually added dropwise in the above reaction vessel over three hours.

| | |
|---|---|
| Methyl methacrylate, monomer | 51 parts |
| 2-Hydroxyethyl methacrylate, monomer | 4.2 parts |
| Methacrylic acid, monomer | 11 parts |
| Silicone macromer (Chisso Corporation, FM-0711) | 8 parts |
| Styrene-acrylonitrile macromer (Toagosei Co., Ltd., AN-6) | 4 parts |
| Mercaptoethanol (polymerization chain transfer agent) | 1.2 parts |

Two hour after the completion of the dropwise addition, a solution of 0.1 part of 2,2'-azobis(2,4-dimethyl valeronitrile) dissolved in 5 parts of methyl ethyl ketone was added thereto, and the resulting mixture was further aged at 65° C. for 2 hours and at 70° C. for another 2 hours to obtain a vinyl polymer solution. A part of the vinyl polymer solution was dried at 105° C. for 2 hours under a reduced pressure to completely remove the solvent and to isolate the polymer. The polymer had a weight average molecular weight of about 10,000 and Tg of 180° C.

Then, 5 g of the vinyl polymer obtained by vacuum drying the above vinyl polymer solution, 25 g of toluene and 5 g of anthraquinone dye having the following composition were mixed to completely dissolve same. To this solution, 2 g of aqueous sodium hydroxide solution were added to neutralize a part of the acidic groups of the vinyl polymer. Then, 300 g of ion exchanged water was added thereto and the mixture was stirred and emulsified for 30 minutes using an emulsifying device (NANOMAKER™, manufactured by Nanomizer Co., Ltd.).

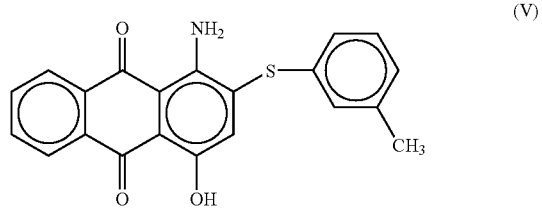

(V)

The thus obtained emulsified product was concentrated by removing toluene completely at 60° C. under a reduced pressure and removing a part of water. Then, impurities such as monomers were removed with an ultrafiltration membrane to obtain Magenta Dispersion Liquid 4 containing vinyl polymer fine particles impregnated with purified dispersive dye (average particle size: 98 nm, solid concentration: 10%).

In the same manner as described above with the exception of using C. I. Disperse Yellow 118 and C. I. Disperse Blue 36 as the dyes, Yellow Dispersion Liquid 4 (average particle size: 98 nm, solid concentration: 10%) and Cyan Dispersing Liquid 4 (average particle size: 98 nm, solid concentration: 10%) were respectively obtained.

Example 1

| Ink Set 1: | |
|---|---|

(1) Black Ink 1 was prepared by adjusting the pH of the composition shown below to 9.5 with 10% aqueous lithium hydroxide solution, followed by filtration through a 0.45 μm TEFLON (polytetrafluoroethylene) filter.

| | |
|---|---|
| Carbon Dispersion Liquid 1 | 5% |
| (as solid concentration in the ink) | |
| Diethylene glycol | 10% |
| Glycerol | 10% |
| N-Hydroxyethylpyrrolidone | 2% |
| 2-Ethyl-1,3-hexanediol | 1% |
| Surfactant of the formula a-1 above | 0.2% |
| Sodium dehydroacetate | 0.2% |
| Ion exchanged water | balance |

(2) Yellow Ink 1 was prepared by mixing and dissolving the following composition and adjusting the pH at 7.2 with sodium hydroxide.

| | |
|---|---|
| Yellow Dispersion Liquid 2 | 3% |
| (as solid concentration in the ink) | |
| Compound of the formula (II) | 2% |
| (X: nitrate ion) | |
| 1,2,6-Hexanetriol | 4% |
| 1,5-Pentanediol | 8% |
| N-Methyl-2-pyrrolidone | 8% |
| Surfactant of the formula a-1 above | 1.2% |
| Surfactant of the formula d above | 1.0% |
| (p, q = 10) | |
| 25% Aqueous solution of surfactant of the formula b-1 | 0.8% |
| Urea | 5% |
| Ion exchanged water | balance |

(3) Magenta Ink 1 was prepared in the same manner as in (1) above with the exception that the following composition was used and that the pH was adjusted to 8.5 with lithium hydroxide.

| | |
|---|---|
| Magenta Dispersion Liquid 1 | 3% |
| (as solid concentration in the ink) | |
| Compound of the formula (III) | 2% |
| (X: nitrate ion) | |
| Diethylene glycol | 5% |
| Glycerol | 5% |
| N-Hydroxyethylpyrrolidone | 10% |
| Styrene-acrylic acid polymer | 0.5% |
| Surfactant of the formula c above | 2% |
| (R: $C_9H_{19}$, k: 12) | |
| 25% Aqueous solution of surfactant of the formula b-3 | 0.2% |
| Sodium dehydroacetate | 0.2% |
| Ion exchanged water | balance |

-continued

Ink Set 1:

(4) Cyan Ink 1 was prepared in the same manner as in (1) above with the exception that the following composition was used and that the pH was adjusted to 9.5 with lithium hydroxide.

| | |
|---|---|
| Cyan Dispersion Liquid 2 | 2% |
| Compound of the formula (III) | 2.2% |
| (X: nitrate ion) | |
| Ethylene glycol | 5% |
| Glycerol | 2% |
| 1,5-Pentanediol | 8% |
| 2-pyrrolidone | 2% |
| Polyoxyethylene block copolymer | 1% |
| Surfactant of the formula a-1 above | 0.8% |
| 25% Aqueous solution of surfactant of the formula b-4 | 2% |
| Urea | 5% |
| Sodium benzoate | 0.2% |
| Ion exchanged water | balance |

Example 2

Ink Set 2:

(1) Black Ink 2 was prepared by adjusting the pH of the composition shown below to 7.8 with sodium hydroxide.

| | |
|---|---|
| Carbon Dispersion Liquid 3 | 4.2% |
| Fast Black 2 | 1.5% |
| Triethylene glycol | 5% |
| Petriol | 10% |
| N-Methyl-2-pyrrolidone | 5% |
| Surfactant of the formula a-5 above | 2% |
| 25% Aqueous solution of surfactant of the formula b-2 | 1.5% |
| Hydroxyethylurea | 5% |
| Sodium 2-pyridinethiol-1-oxide | 0.2% |
| Ion exchanged water | balance |

(2) Yellow Ink 2 was prepared by mixing and dissolving the following composition and adjusting the pH at 8 with sodium hydroxide.

| | |
|---|---|
| Direct Yellow 132 | 1.5% |
| Yellow Dispersion Liquid 4 | 1.5% |
| (as solid concentration in the ink) | |
| 2-Pyrrolidone | 8% |
| Glycerol | 7% |
| Compound of the formula (II) | 2% |
| (X: nitrate ion) | |
| Surfactant of the formula a-1 above | 1.2% |
| Surfactant of the formula d above (p, q = 20) | 1% |
| Surfactant of the formula d above (p, q = 10) | 1% |
| 25% Aqueous solution of surfactant of the formula a-6 | 2% |
| Sodium alginate | 0.1% |
| Hydroxyethylurea | 5% |
| Sodium dehydroacetate | 0.2% |
| Ion exchanged water | balance |

(3) Magenta Ink 2 was prepared by mixing and dissolving the following composition and adjusting the pH at 6.8 with lithium hydroxide.

| | |
|---|---|
| Magenta Dispersion Liquid 4 | 2.8% |
| AR 52 (Acid Red 52) | 0.5% |
| Compound of the formula (II) | 1% |
| (X: lactate ion) | |
| N-Methyl-2-pyrrolidone | 8% |
| 1,5-pentanediol | 8% |
| Surfactant of the formula a-5 above | 2% |

-continued

Ink Set 2:

| | |
|---|---|
| Sodium benzoate | 0.5% |
| Magnesium nitrate (polyvalent metal ion) | 0.5% |
| Ion exchanged water | balance |

(4) Cyan Ink 4 was prepared by mixing and dissolving the following composition and adjusting the pH at 9.5 with sodium hydroxide.

| | |
|---|---|
| Cyan Dispersion Liquid 4 | 4.0% |
| (as solid concentration in the ink) | |
| Organic dye C3 shown above | 1.2% |
| Compound of the formula (III) | 1% |
| (X: lactate ion) | |
| Ethylene glycol | 5% |
| Glycerol | 2% |
| 2-Ethyl-1,3-hexanediol | 2% |
| 2-pyrrolidone | 2% |
| Polyoxyethylene block copolymer | 1% |
| Surfactant of the formula a-1 above | 0.8% |
| 25% Aqueous solution of surfactant of the formula b-4 | 2% |
| Urea | 5% |
| Sodium benzoate | 0.2% |
| Ion exchanged water | balance |

Comparative Example 1

Ink Set 3 was prepared in the same manner as that for the Ink Set 1 of Example 1 except that compound of the formula (II) in the Yellow Ink 1 was not used, that the compound of the formula (III) in the Magenta Ink 1 was not used and that the compound of the formula (III) in the Cyan Ink 1 was not used.

Comparative Example 2

Ink Set 4 was prepared in the same manner as that for the Ink Set 2 of Example 2 except that compound of the formula (II) in the Yellow Ink 2 was not used, that the compound of the formula (III) in the Magenta Ink 2 was not used and that the compound of the formula (III) in the Cyan Ink 2 was not used.

Each of the Ink Sets of Examples 1 and 2 and Comparative Examples 1 and 2 was subjected to the following tests.

(1) Image Clearness:

Printing was performed using an ink jet printer of a thermal ink jet type which has 300 nozzles having a nozzle diameter for each color of 18 μm and a pitch of 600 dpi; an ink jet printer of a type which employs a laminated PZT for applying a pressure to channels of liquid chambers and which has 300 nozzles with a diameter for each color of 28 μm and a pitch of 200 dpi; and an ink jet printer of a type which employs an electrostatic actuator for applying a pressure to channels of liquid chambers and which has 300 nozzles for each color. Then, the image clearness was collectively determined by evaluation of bleeding at boundaries between two superimposed colors, and the blurs, tone and density of the images with naked eyes. The color development on OHP projection was also evaluated. Commercially available recycled paper, fine quality paper, bond paper, gloss film having an absorbing layer of a water-soluble resin and an OHP sheet were used as printing media.

The image clearness was rated as follows:

5: No bleeding at boundaries of superimposed two colors was observed, and images with high density and good color reproduction were obtained, regardless of the type of paper 4: The same as 5 above except that the image density was slightly low
3: Bleeding at color boundaries was not observed, but non-uniformity in secondary colors was observed in some of the papers
2: Bleeding at color boundaries was observed in some of the papers
1: Bleeding at color boundaries was observed in some of the papers and images had low density and were unclear (2) Water Resistance of Images:

Image samples were immersed in water at 30° C. for 1 minute. A change in the image density before and after the treatment was measured with an X-Rite 938. Water resistance (fading ratio %) was calculated by the following equation:

Fading ratio(%)=[1−(image density after treatment/(image density before treatment)]×100

The water resistance was rated as follows:
5: 10% or less in all the types of paper
4: 20%
3: less than 30%
2: 30% or more
1: 50% or more (3) Drying Efficiency of Image:

A filter paper was pressed onto printed images under predetermined conditions and the time until the ink was no longer transferred to the filter paper was measured. The drying efficiency was rated as follows:
A: Ink was dried within 10 seconds in all the types of paper
B: Ink was not dried within 10 seconds in all the types of paper (4) Preservability:

Each ink was placed in a polyethylene container and stored under at −20° C., 5° C., 20° C. and 70° C. for three months. After the storage, a change in the surface tension, viscosity and particle diameter and formation of precipitates were investigated. Ink sets exhibiting no change in the properties or the like under any of the above conditions are rated as rank A.

(5) Reliability after Printing Pause:

Using a printer of a type which had a head operated by a PZT having 128 nozzles with a nozzle diameter of 30 μm, capability of resuming the printing after pausing without capping and cleaning operations was investigated. The reliability was evaluated by observing deviation of jet direction and change in weight of ejected droplets according to the following ratings:
5: no problems were specifically observed
4: change in weight of droplets was small and deviation of the jet direction was within tolerable range
3: small deviation of the jet direction was observed
2: change in weight of droplets was significant but no clogging was observed
1: significant clogging was observed The results are summarized in Table 1.

TABLE 1

| | Image Clearness | Water Resistance of Image | Drying Efficiency of Image | Pre-servability | Ejection Reliability |
|---|---|---|---|---|---|
| Example 1 | 5 | 5 | A | A | 5 |
| Example 2 | 5 | 5 | A | A | 4 |
| Comparative Example 1 | no good in 2RGB | 4 | A | A | 5 |
| Comparative Example 2 | no good in 3RGB | 4 | A | A | 4 |

INDUSTRIAL APPLICABILITY

As will be appreciated from the foregoing, when the ink set for ink jet recording according to the present invention uses an ink A containing a coloring material having an anionic group and an ink B containing a specific quaternary ammonium salt, it is possible to obtain an ink set capable of exhibiting excellent secondary color reproducibility on plain paper even when the color image is formed at a high speed.

When the ink set for ink jet recording according to the present invention uses a black ink containing a self-dispersion type carbon black, it is possible to obtain an ink set capable of suppressing bleeding on boundaries between black and color images on plain paper.

When the ink set for ink jet recording according to the present invention uses an ink A containing a self-dispersion type organic pigment and an ink B containing the specific quaternary ammonium salt, it is possible to obtain an ink set capable of preventing occurrence of amalgamation of pixels and reduction of chroma of the secondary color so that the color reproduction can be effectively carried out on plain paper.

When the ink set for ink jet recording according to the present invention uses suitable combination of coloring materials, it is possible to obtain an ink set suitable for forming color images on plain paper.

When the ink set for ink jet recording according to the present invention uses a water-soluble organic solvent which can adjust the viscosity of the ink, which can ensure moisture retaining property and which is free of generation of aggregation of coloring materials, it is possible to obtain an ink set capable of forming images on plain paper even after storage for a long period of time.

When the ink set for ink jet recording according to the present invention uses a specific kind of a surfactant suitable for improving wettability to paper, it is possible to form images on plain paper in a satisfactory manner.

When the ink set for ink jet recording according to the present invention uses a suitable hydrophilic solvent capable of improving wettability of the ink to paper and of imparting penetration tendency into paper, it is possible to form images on plain paper in a further satisfactory manner.

When the ink set for ink jet recording according to the present invention uses an ink having a specific pH range, it is possible to obtain suitable matching property with parts used in the recording apparatus.

Since the ink jet recording method according to the present invention uses the above ink set, it is possible to form, at a high speed printing, high quality color images having excellent secondary color reproducibility.

An ink cartridge and apparatus for ink jet recording according to the present invention can form images with excellent secondary color reproducibility even when the color images are formed at a high speed, and the ink cartridge and apparatus contain an ink set which does not give bad influence to the ink cartridge.

The invention claimed is:

1. An ink set for use in an ink jet recording process wherein at least two aqueous inks A and B having different hues are superimposed to form a color image, characterized in that, of the two aqueous inks A and B, one ink A comprises a coloring material A having an anionic group and in that the other ink B comprises a coloring material B and a quaternary ammonium salt having at least one alkyl group which has 6 or less carbon atoms and which has a hydroxyl group, wherein said quaternary ammonium salt is represented by the following general formula (II), (III) or (IV):

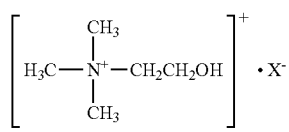

wherein X− represents a counter ion,

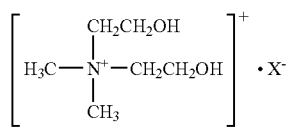

wherein X− represents a counter ion,

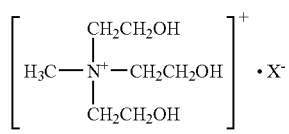

wherein X− represents a counter ion.

2. An ink set for use in an ink jet recording process as recited in claim 1, wherein said ink A is a black ink containing a self-dispersion type pigment comprising anion group-bearing carbon, in that said ink B is a color ink selected from the group consisting of an yellow ink, an cyan ink and a magenta ink.

3. An ink set for use in an ink jet recording process as recited in claim 1, wherein said ink A is a color ink selected from the group consisting of an yellow ink, an cyan ink and a magenta ink, and in that said coloring material A contained in said ink A is a self-dispersion type pigment having an anionic group.

4. An ink set for use in an ink jet recording process as recited in claim 1, wherein said coloring material B contained in said ink B is a water-insoluble coloring material, and in that said ink B comprises a polymer dispersing agent.

5. An ink set for use in an ink jet recording process as recited in claim 1, wherein said coloring material B contained in said ink B is a water-insoluble coloring material, and in that said ink B comprises a surfactant dispersing agent.

6. An ink set for use in an ink jet recording process as recited in claim 1, wherein said coloring material B is a dye having a carboxylic acid group and/or a sulfonic acid group.

7. An ink set for use in an ink jet recording process as recited in claim 1, wherein said coloring material B comprises fine particles colored with a dye or a pigment.

8. An ink set for use in an ink jet recording process as recited in claim 1, wherein said ink A and/or B comprises at least one water-soluble organic solvent selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone and 1,3-dimethyl-2-imidazolidinone.

9. An ink set for use in an ink jet recording process as recited in claim 1, wherein said ink A and/or B comprise at least one surfactant selected from the group consisting of acetylene glycol surfactants, polyoxyethylene alkyl ether surfactants, polyoxyethylene alkylphenyl ether surfactants and fluorine-containing surfactants.

10. An ink set for use in an ink jet recording process as recited in claim 1, wherein said ink A and/or B comprise an acetylene glycol surfactant having 6 or more carbon atoms in the main chain thereof, and a polyoxyethylene phenyl ether having a polyoxyethylene moiety having a polymerization degree of 5 to 12.

11. An ink set for use in an ink jet recording process as recited in claim 1, wherein said ink A and/or B have a pH of 6 to 11.

12. An ink jet recording method wherein an ink set comprising at least two aqueous inks A and B having different hues is used to form a color image and wherein said at least two aqueous inks A and B are superimposed on a recording medium to form an image thereon, wherein said ink set used is an ink set according to claim 1.

13. An ink jet recording method as recited in claim 12, wherein said recording medium has a Stockigt sizing degree of 3 or more seconds.

14. An ink cartridge for ink jet recording, comprising ink containers containing an ink set, wherein said ink set is an ink set according to claim 1.

15. An ink jet recording apparatus comprising ink containers or an ink cartridge containing an ink set, wherein said ink set is an ink set according to claim 1.

* * * * *